United States Patent [19]

Laar

[11] 4,247,739

[45] Jan. 27, 1981

[54] HOLDER FOR CYLINDRICAL CABLE SLEEVES

[75] Inventor: Hans Laar, Munich, Fed. Rep. of Germany

[73] Assignee: Siemens Aktiengesellschaft, Berlin & Munich, Fed. Rep. of Germany

[21] Appl. No.: 4,371

[22] Filed: Jan. 18, 1979

[30] Foreign Application Priority Data

Jan. 26, 1978 [DE] Fed. Rep. of Germany ....... 2803391

[51] Int. Cl.³ .................... H01F 17/08; H01F 15/02; H01F 15/12
[52] U.S. Cl. ........................... 178/46; 336/68; 336/208
[58] Field of Search ............... 178/45, 46; 336/65–68, 336/90–96, 199, 208; 174/17 R, 17 CT, 52 R, 52 PE, 52 S

[56] References Cited

U.S. PATENT DOCUMENTS

| 3,526,712 | 9/1970 | Drom | 178/46 |
| 3,943,412 | 3/1976 | Wickstrom | 336/67 X |

FOREIGN PATENT DOCUMENTS 1925244 1/1965 Fed. Rep. of Germany.

Primary Examiner—Marvin L. Nussbaum
Attorney, Agent, or Firm—Hill, Van Santen, Steadman, Chiara & Simpson

[57] ABSTRACT

A holder for providing coils for compensation of local connections of cores of a cable within a cable sleeve characterized by a holding member having a ring-shaped cross section with a splicing space disposed in the interior and with a portion of the holding member being movable to enable access to the splicing space from the exterior of the member, a detachable connecting device to enable forming a connection to a cable inserted into the splicing space from an end of the holding member and coil cups disposed on the outer surface of the holding member to surround the splicing space.

10 Claims, 5 Drawing Figures

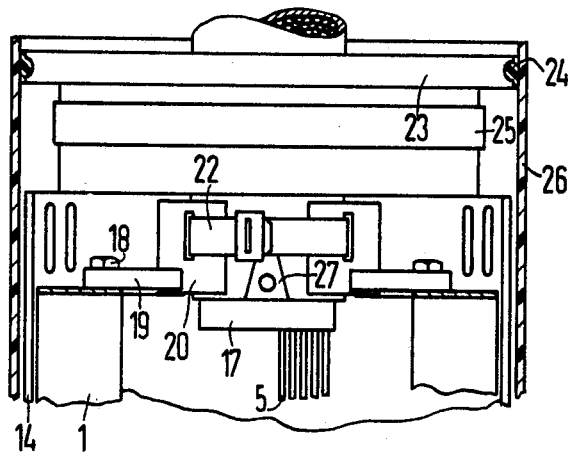
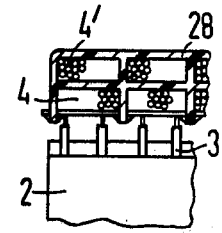
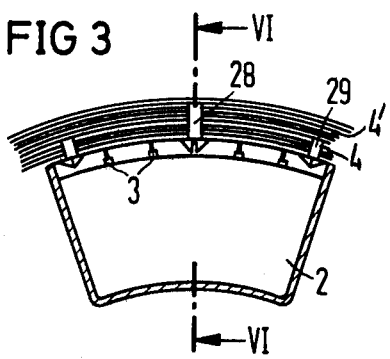
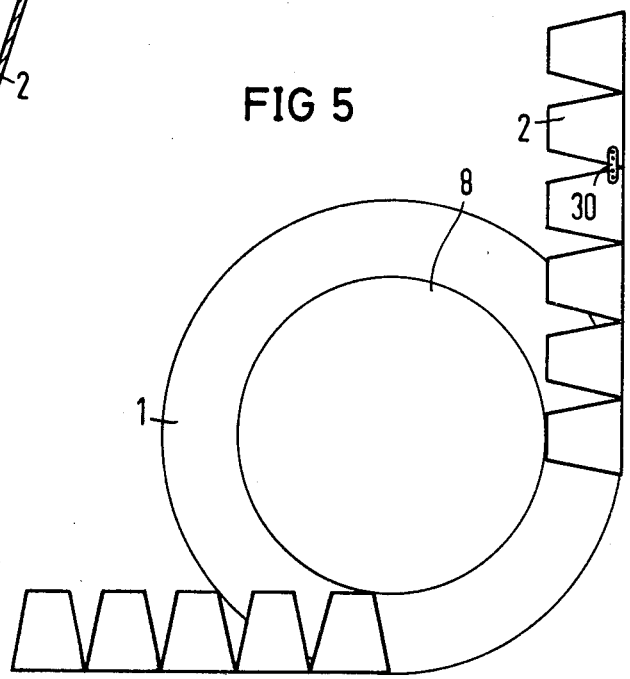

HOLDER FOR CYLINDRICAL CABLE SLEEVES

BACKGROUND OF THE INVENTION

The present invention is directed to a holder for arrangement of coils for compensation in the cores in local connections of cores of a cable within a cable sleeve.

Holders or coil carriers for cylindrical cable sleeves are known. Usually they are secured at the sleeve heads or at the cable introductions or respectively at the cable supports. The coils are located in the core of the sleeve and their connections are directed to the outside or to the top so that the cores of the cables are lead passed the cores on the outside and can be connected without difficulty. This arrangement is only practical up to a specific sleeve diameter or up to a specific number of coils.

In an arrangement which requires a large number of coils which large number required a large capacity local connection of cores of the cable, special two-part trough-like coil sleeves were developed in which the coil carriers have an arppoximately U-shape. The cores are arranged ring-like on a two-thirds circle with their connections toward the outside. The connections with the cores of the cable proceed in the sleeve cores occur by multiple twin cable connection lines which are conducted separately from incoming and outgoing cable cores from the coils to the cable cores. The core carrier is screwed to the lower trough which in turn is releasably connected with a carrying support, which projects beyond it in its length. When the device is used below ground, the core sleeves or pieces are protected by means of caps made of plastic which are slipped over them.

SUMMARY OF THE INVENTION

The present invention is directed to an object of creating a coil carrier or holder with approximately the same capacity and with an accessable splicing space which can be built into a cylindrical universal sleeve with a simple closure principle. The holder is significantly smaller and lighter and can also be mounted below ground without requiring the protective caps and without it being necessary to arrange additional securing possibilities on the cable sleeve for that purpose.

The objects of the present invention are achieved by a holder for providing coils for compensation of multiple connection of cores of a cable within a cable sleeve comprising a holding member having a ring-shaped cross section with a splicing space disposed in the interior thereof, said holding member having means enabling access to the splicing space from the exterior of said member, means disposed on the holding member for forming a detachable connection to an end of a cable inserted into the splicing space from an end of the holding member and coil cups disposed on an outer surface of the holding member to surround the splicing space.

The essence of the invention lies in that the coil carrier or holder possesses a cylindrical shape with a ring-shaped cross section so that the holder exhibits supports at both ends with which it can form a detachable connection with the cable ends. The coil cups in which the coils are arranged are arranged in a star-shaped arrangement on the perimeter of the ring-shaped holder so that the splicing space is produced in the interior of the ring-shaped holding member. In accordance with the invention, this splicing space is now made accessible from the outside by means of an opening which is formed either by pivoting a portion of the holding member from the remaining portion or by rolling up a specific part of the ring-shaped coil carrier. Further, the coil bodies can be rotated out in such a manner that the cable ends are laid free for splicing jobs.

The support of the holder forming a portion of the means for forming the detachable connection are adjustable radially outwardly so that the holder can be secured to cables of varying diameters. The ends of the support are expediently designed of a pair of flanges extending at an angle to each other to form a notch for receiving the periphery of the cable so that upon assembly a certain centering of the cable axis can be achieved. The supports and end faces of the holder are further designed in such a manner that the support may be adjusted along the periphery of the ring-shaped holding member to enable adjustment of the holder to the cable in a direction which is transverse to the length of the support. Such an adjustment will enable spreading out the ends of the cable which will enable performing a splicing job.

In the arrangement of the invention, it is possible to connect the connecting lines of the coils directly into the splicing space where they can be connected with the cores of the cable. By means of the corresponding numbering strips an orientation and identification of the lines is possible. However, because of the favorable design of the holder, it is also possible to undertake the guidance of the cores of the cable or respectively of the connecting lines along the outer or inner perimeter of the ring-shaped holding member. By means of guides, an arrangement in groups which, for example, are arranged according to incoming and outgoing cores of the cable is also possible. Within the framework of the invention, finally the possibility is also offered of connecting individual coil cups to one another in a chain-like manner so that in a certain sense they can be rolled up as a totality to form the outer periphery of the ring-shaped carrier member. The coil cups can be provided with corresponding catches so that when the chain-like coil cups are uncoiled to form an opening to gain access to the splicing space, the necessary propping of the opened up or uncoiled coil cups can occur. As needed, the number of coils can be increased and that additional mountings for coils are secured on the ring-shaped coil carrier in the center of the splicing space between the cable ends.

In rare cases, it will also occur that the cable sleeve with coil carriers must additionally serve as a branching sleeve with a plurality of cable introductions. This possibility is offered with consideration of the cable position by means of a corresponding formation of the support to be attached at the cable ends. Thus, separate branching sleeves, which are otherwise generally used, can be done away with.

BRIEF DESCRIPTION OF THE DRAWINGS

FIG. 2 is a partial cross section of a holder in accordance with the present invention arranged in the cable sleeve;

FIG. 3 is a partial cross section illustrating an embodiment for conducting connecting lines of the exterior perimeter of the coil carrier shown;

FIG. 4 is a partial cross section taken along lines IV—IV of FIG. 3; and

FIG. 5 is a schematic view illustrating the coil cups arranged in a chain-like manner to be coiled on the outer periphery of the holding member.

DESCRIPTION OF THE PREFERRED EMBODIMENTS

Figure 1:
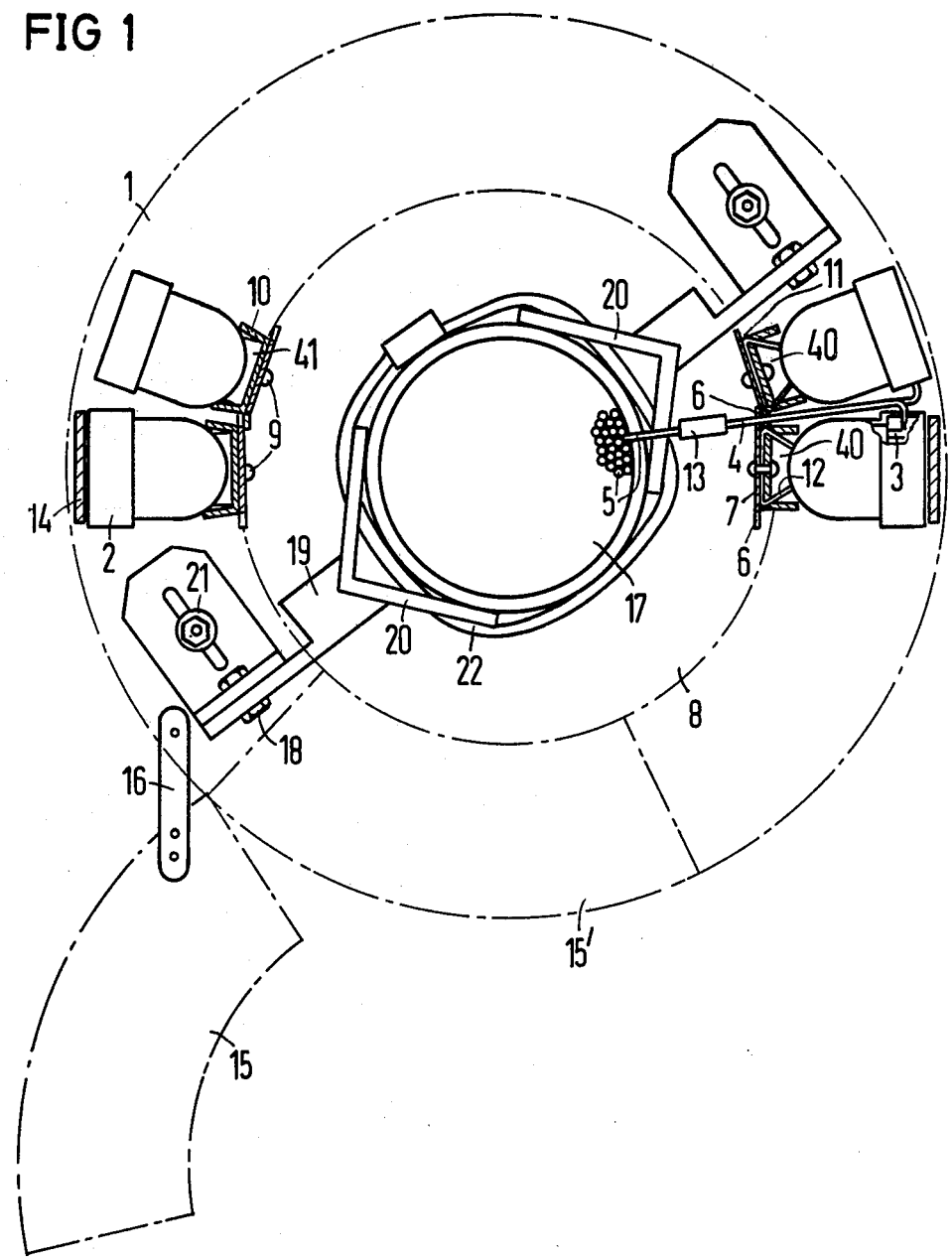
FIG. 1 is an end view of a holder or coil carrier in accordance with the present invention with portions indicated schematically for purposes of clarity.

The principles of the present invention are particularly useful for a holder or coil carrier 1 of FIG. 1. As illustrated, the holder 1 includes a holding member which has a ring-like cross section and is arranged around the end of the cable 17 and surrounds a splicing space 8. A plurality of coil cups 2 are arranged on the holding member of the coil carrier 1 so that a connection 3 of the coils receives in each of the cups 2 are directed toward the outside of the holder 1. The connections 3 of the coils are connected with corresponding cores 5 of the cable 17 by means of a suitable connecting means 13 and connecting lines 4 which extend from the connections 3 into the splicing space 8 through slits 6 in a numbered strip 7. The numbered strips 7 are arranged on U-shaped support rails 10 and are uniformly radially distributed on the perimeter of the holder 1. The strips 7 are advantageously numbered and provided with a decadic color grid matched to the group strands. The fastening of the numbered strip 7 may be achieved by means of a buttoning or snap-type mechanism 9.

The support rails 10 for the coil cups 2 extend in the axial direction of the cable sleeve and are secured to the holding member of the coil carrier or holder 1. In a space saving manner, the coil cups can be fastened with leaf springs 12, which are inserted in slits 11 of the support rails 10 and engage dovetailed extensions 40 of the coil cups 2. Instead of using the dovetail extensions 40, another type of fastening is illustrated on the left hand side of FIG. 1. wherein the extensions 41 have a rectangular cross section and are connected to the support rail 10 by means of the buttoning or snap-on mechanism 9 or by the use of countersunk screws.

The holding member of the coil carrier or holder 1 which is briefly only schematically illustrated is provided at each end with means for forming a detachable connection with the end of the cable 17. As illustrated, these means include a support 19, which extends radially inward and is provided with a pair of flanges 20, 20, which extend approximately at a right angle to each other to form a notch for receiving a portion of the periphery of the cable 17. The notches formed by the flanges 20, 20 help center the coil carrier relative to the cable end 17 and coact with a tightening strap 22 which extends through slots to apertures in the flanges 20 for securing the cable and the flanges together.

In order for the means for forming the detachable connection to be adjustable in a radial direction to compensate for the diameter of the cable, radial adjustment means 18 are provided for each of the supports. In order to adjust the position of the cable 17 relative to the axis of the holder 1, the means for forming a detachable connection includes means 21 for positioning the support along the periphery of the holding member to enable adjusting in a direction extending substantially transverse to the length of each of the supports 19. As illustrated, each of the means 18 and 21 utilize a threaded fastener in an elongated slot. By means of the adjustment means 21, the end of the cable 17 may be positioned outside of the splicing space 8 during a splicing job to facilitate forming the various splices.

In order to obtain access to the splicing space, the holding member has means forming an opening to enable access from the exterior. As illustrated, a portion such as a segment 15 of a ring may be pivoted to an open position by means of the catch or link 16 to create an opening 15'. It should be noted that in this arrangement it is possible to arrange the connecting rails 14, which are necessary for the cable support and grounding within the cable sleeve to be clear of this opening.

The use of the holder 1 in a sleeve is best illustrated in FIG. 2. As illustrated, the holder 1 is disposed within a sleeve 26. A cable end 17 with cores or stands 5 is introduced into the cable sleeve 26 through a sealing body 23 which is held together by a tightening band 25 and is sealed against the cable sleeve 26 by means of a sealing compound 24. The notch-like flanges 20 of the supports 19 are secured to the cable end 17 by means of the band 22. The supports 19 are connected to the holding member of the holder 1 via the means 18 for radial adjustment and centering of the holder 1 relative to the end of the cable. The connection rails 14 which are connected to the cable shield via perforated bands can be arranged on both sides along the holder 1 so that the continuation of the shield voltage can be provided in the cable sleeve. The connection between the perforated bands and the cable shield is ensured by means of a shield post 27. Upon the use of the conductive material for the coil carrier or holder 1, it is also possible to produce the shield connection via itself.

In a special embodiment, the coil carrier can be arranged directly at the sealing body of the cable sleeve so that a shorter sleeve construction and length can be obtained. The electrical conductive and mechanical connection of the cable jacket or respectively cable shield to the holder 1 is then ensured by means of clamping the flanges 20 onto the screws of the shield post 27 and the connection between the holder 1 and the sealing body 23 is produced by the strap.

As illustrated in FIG. 3, a modified coil cup 2 is arranged in a modified rail. The connections 3 of the coil in the cup 2 are directed to the outside. The connecting lines 4 and 4' respectively are arranged in the exterior perimeter of the holder 1 and are subdivided into specific groups such as a group for incoming cores, which is symbolized with 4, and outgoing 4' cable cores. The subdivision of the lines into groups is facilitated by means of guides 28 and 29 which are arranged on the cover over the coil cups 2.

As best illustrated in FIG. 4, the subdivisisions of groups 4 and 4' is illustrated with respect to the guide 28 which lies on the exterior periphery of the coil carrier. However, identical arrangement is possible on the interior perimeter of the coil carrier but certain difficulties are produced from rotating out of the hinge ring segments 15. In this case, a length extension for the rotating out of the ring segments 15 is necessary. Since the pivot point of the right segment 15 is likewise located in the outer perimeter, this length extension is emitted in the arrangement of the connecting lines 4, 4' on the outer perimeters. In the guidance of the connecting lines 4 and 4', it is expedient to undertake the introduction into the splicing space 8 via numbered strips. The clarity is increased when separate numbering strips are used for each cable direction. Further, the connecting lines 4, 4', respectively, are advantageously adapted in their identification and stranding to the cables to be respectively loaded with coils. The numbering strips which are advantageously designed cone-like with recesses for the respective connecting lines as well as the coil cups can thereby be designed in a manner and adapted to the respective sample embodiments according to the invention.

In the sample embodiment illustrated in FIG. 5, the connections of the coil cups 2 expedient point toward the splicing space 8 so that the connection lines can be emitted. The design of these connections is particularly advantageous for solder-free connection of the cores 5 of the cable to the connection of the coils.

FIG. 5 further shows the coil cups 2 are interconnected or hinged to each other in a chain-like manner so that the coil cups 2 can be rolled up on the ring-shaped holding member of the holder 1. To enable access to the splicing space 8 a portion of the cups are uncoiled to provide the opening and can be held in the opened position by means of catches such as 30 which extend between the various cups.

The fastening of the hinge coil cups can be accomplished in a multitude of ways. For example, simple snap-on means can be utilized which use either springs or snappable elements.

Although various minor modifications may be suggested by those versed in the art, it should be understood that I wish to embody within the scope of the patent warranted hereon all such modifications as reasonably and properly come within the scope of my contribution to the art.

I claim:

1. A holder for providing coils for compensation in local connections of cores of a cable within a cable sleeve comprising a holding member having a ring-shaped cross section with a splicing space disposed in the interior thereof, said holding member having means enabling access to the splicing space from the exterior of said member, said means for enabling including a portion of the holding member having a segment pivotably movable relative to the holding member to provide an opening, means disposed on the holding member for forming a detachable connection to an end of a cable inserted into the splicing space from an end of the holding member, and coil cups disposed on an outer surface of the holding member to surround the splicing space.

2. A holder according to claim 1, wherein each of the coil cups being detachably secured on the outer surface of the holding member by snap-on means including spring elements.

3. A holder according to claim 1, wherein the means for forming a detachable connection includes a support terminating in flanges extending at an angle to each other to form a notch for engaging a cable end to position it in the holding member.

4. A holder according to claim 3, wherein the means for forming a detachable connection includes means for radially adjusting the position of the ends of the supports to enable radial adjustment of the holder to the end of the cable attached therein.

5. A holder according to claim 4, wherein the means for forming a detachable connection includes means for positioning the support along the periphery of the holding member to enable adjustment of the holder to the cable in a direction which is transverse to the length of the support.

6. A holder according to claim 1, which includes guides for the cores of the cable, said guides being arranged on exterior perimeter of the holding member.

7. A holder for providing coils for compensation in local connections of cores of a cable within a cable sleeve comprising a holding member having a ring-shaped cross section with a splicing space disposed in the interior thereof, means disposed on the holding member for forming a detachable connection to an end of a cable inserted into the splicing space from an end of the holding member, and individual coil cups being secured together in a chain-like manner so that they may be formed into a cylindrical shell, said cylindrical shell of coil cups being disposed on an outer surface of the holding member to surround the splicing space, said holding member having means enabling access to the splicing space from the exterior of said member, said means enabling access comprising uncoiling a portion of the chain-like coil cups to provide an opening to the splicing space.

8. A holder for providing coils for compensation in local connections of cores of a cable within a cable sleeve comprising a holding member having a ring-shaped cross section with a splicing space disposed in the interior thereof, said holding member having means enabling access to the splicing space from the exterior of said member, means disposed on the holding member for forming a detachable connection to an end of a cable inserted into the splicing space from an end of the holding member, said means for forming a detachable connection including a support terminating in flanges extending at an angle to each other to form a notch for engaging a cable end to position it in the holding member, and coil cups disposed on an outer surface of the holding member to surround the splicing space.

9. A holder according to claim 8, wherein the means for forming a detachable connection includes means for radially adjusting the position of the ends of the supports to enable radial adjustment of the holder to the end of the cable attached therein.

10. A holder according to claim 9, wherein the means for forming a detachable connection includes means for positioning the support along the periphery of the holding member to enable adjustment of the holder to the cable in a direction which is transverse to the length of the support.

* * * * *